United States Patent [19]

Schumacher

[11] Patent Number: 5,934,319
[45] Date of Patent: Aug. 10, 1999

[54] HYDRAULIC COUPLING

[76] Inventor: Gustav Schumacher, Gartenstrasse 8, 57612 Eichelhardt, Germany

[21] Appl. No.: 08/857,278

[22] Filed: May 16, 1997

[30] Foreign Application Priority Data

May 17, 1996 [DE] Germany .............................. 196 19 839

[51] Int. Cl.$^6$ ...................................................... F16L 37/28
[52] U.S. Cl. ................................. 137/614.06; 137/614.05
[58] Field of Search .......................... 137/614.06, 614.05, 137/614; 251/149.9

[56] References Cited

U.S. PATENT DOCUMENTS

| | | | |
|---|---|---|---|
| 2,675,829 | 4/1954 | Livers | 137/614.06 |
| 4,009,729 | 3/1977 | Vik | 137/614.06 X |
| 5,316,033 | 5/1994 | Schumacher et al. | 137/614.06 X |

FOREIGN PATENT DOCUMENTS 43 18 840 C2  9/1994  Germany .

*Primary Examiner*—Kevin Lee
*Attorney, Agent, or Firm*—Harness, Dickey & Pierce, P.L.C.

[57] ABSTRACT

A coupling for connecting hydraulic pipelines has a first coupling part (1) and a second coupling part (2). The two coupling parts each include a valve (V1, V2, V3). A receiving part (4) is provided which is associated with the first coupling part (1). The receiving part (4) serves to receive the second coupling part (2). A locking sleeve (38) and a locking element (40) can be locked relative to the receiving part (4). To facilitate actuation of the locking sleeve (38) in the opening sense, a rotational play is provided between a switching member (23) to actuate the valve body (8) of the valve (V1) and the switching shaft (27) to actuate the switching member (23). The rotational play can be used for moving the locking sleeve (38) into the open position via an opening element (47) which is adjusted by an actuating element (48).

16 Claims, 5 Drawing Sheets

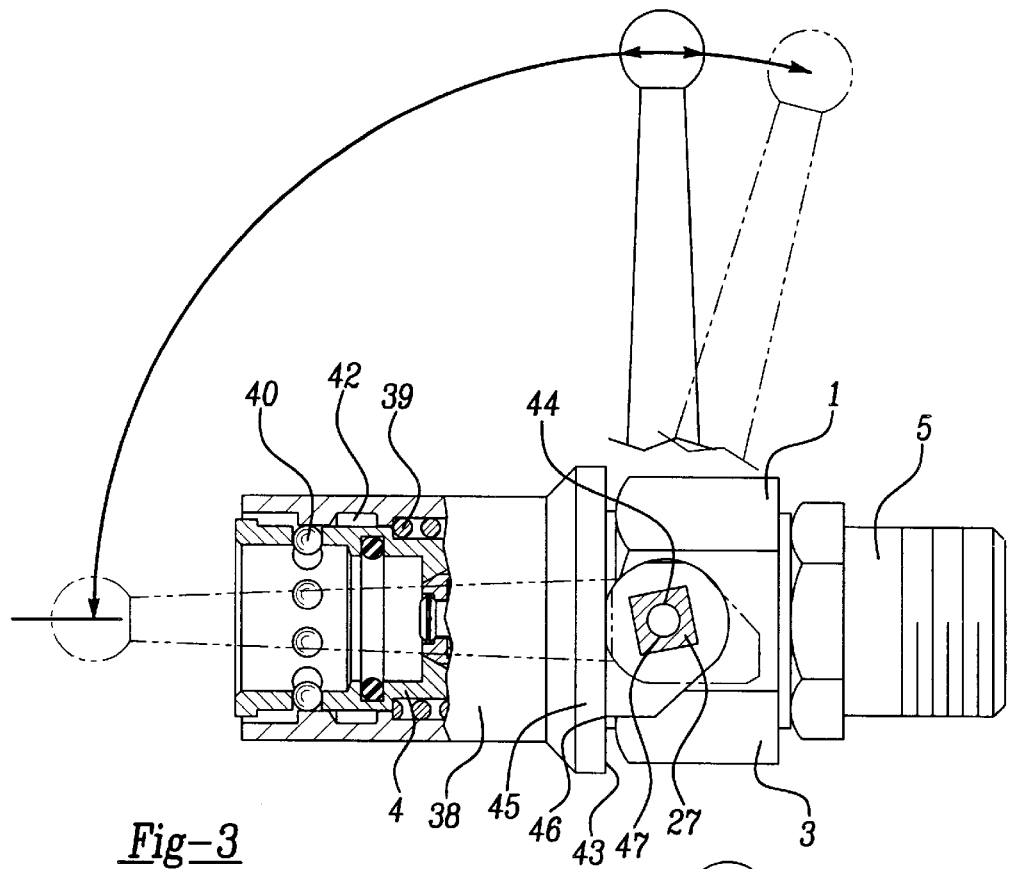
_Fig-3_
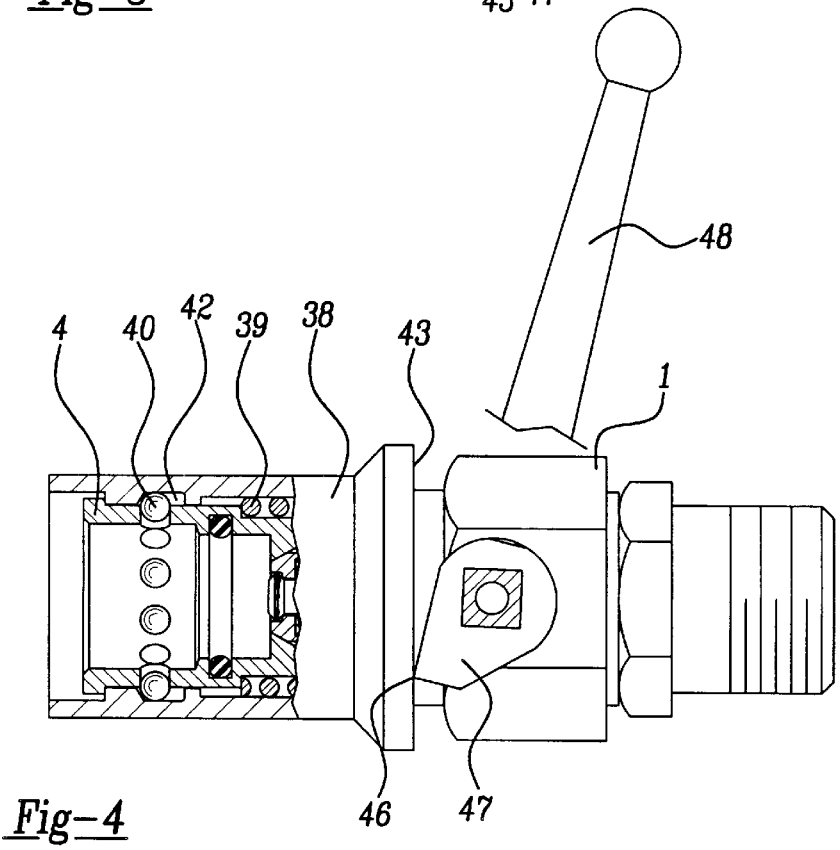
_Fig-4_

HYDRAULIC COUPLING

BACKGROUND OF THE INVENTION

The invention relates to a coupling to connect hydraulic pipelines. The coupling has a first coupling part and a second coupling part. The first coupling part includes a first valve received in a housing of the first coupling part and means for receiving the second coupling part. The second coupling part includes a second valve. The first valve includes a valve body which, in the closed position, contacts a sealing face of the housing of the first coupling part. The valve body is axially penetrated by a switching pin. The switching pin is adjustable relative to the valve body towards the second valve. The coupling also includes a switching shaft with an actuating member. The switching shaft is arranged transversely to the valve axis, penetrates the housing of the first coupling part and carries a switching member. The switching member serves to adjust the switching pin and the valve body. For adjustment purposes, the switching member, the valve body and the switching pin include switching faces. The switching pin is loaded towards the switching member by an opening spring supported on the valve body of the first valve. The valve body of the first valve is loaded by a closing spring in the direction of the sealing face of the housing. The loading effect is achieved by actuating the actuating element which, in turn, rotationally adjusts the switching member. The switching pin serves to move the second element into the open position. The housing of the first coupling part is associated with an axially adjustable locking sleeve. The locking sleeve has locking elements which, in the coupled condition, lock the two coupling parts relative to one another. The locking sleeve is transferable, by axial adjustment, into a releasing position.

A coupling is described in DE 43 18 840 C2. A coupling serves to ensure that the two coupling parts do not rest against one another. Thus, oil leakages are reduced to a minimum during the uncoupling operation. This constitutes an advantage compared to couplings described, for example, in ISO 5675 and SAE-J1036 standard, respectively, wherein the sealing cones are extended by a projection which already opens the valves during the coupling operation.

In DE 43 18 840 C2, the switching pin is held in constant contact with the switching member by an opening spring. The switching pin follows the slightest movement of the switching shaft even when the coupling is closed. Furthermore, the switching pin is sealed relative to the valve member of the first coupling part according to rod sealing principles. If the first coupling part is subjected to a static hydraulic pressure, the switching pin is not fully withdrawn by its returning spring. If it is then the intention to couple a pressurized second coupling part, it first has to be ensured, for instance by actuating a control device accordingly, that the first coupling part is depressurized to the extent that the switching pin fully withdraws into the housing. Furthermore, the coupling has to be operated with two hands to connect the coupling parts as well as switch the two switching valves by actuating the actuating element. A certain operating sequence has to be observed. For example, to couple the two coupling parts, it is necessary, first, to transfer the locking sleeve by hand into a releasing position so that the locking elements are able to escape. Once the final coupling position has been reached, the locking sleeve can be released. Under the effect of a spring loading the locking sleeve, the locking sleeve returns into a position where the locking elements engage recesses in the second coupling part to produce a unit. It is only then that the actuating element is actuated to adjust the switching member in order to transfer the two valves into the open position. During the uncoupling operation, first, the switching member has to be transferred into a rotational position which corresponds to the closed position. Subsequently, the coupling sleeve has to be slipped on by hand. The disadvantage is that as a result of the pressure built up in the system, it is necessary to apply high actuating forces.

SUMMARY OF THE INVENTION

It is an object of the invention to provide a coupling to connect hydraulic pipelines, especially to facilitate uncoupling of the coupling.

In accordance with the invention, in the coupled condition of the two coupling parts and valves and in the position of the switching member which corresponds to the closed position of the two, there exists, alternatively or cumulatively, a rotational play between the switching faces of the switching member and the opposed switching faces of the switching pin and the valve member of the first valve, between the switching shaft and the switching member and between the actuating element and the switching shaft. The switching shaft or the actuating member is associated with an opening element. Upon rotational adjustment of the actuating element and when passing through the rotational play against the direction of rotation of the switching member from the closed position into the open position, the opening element loads the locking sleeve in order to be moved into the releasing position.

The rotational play may be provided in only one of the above-mentioned pairs of elements or in a plurality of pairs of elements. Thus, the pairs achieve a cumulative total rotational play required to move the locking sleeve into the releasing position.

An advantage to this solution is that the uncoupling operation is facilitated. The actuating element makes it possible to apply higher switching forces in order to adjust the locking sleeve. In spite of high pressure forces occurring, for example, between the locking elements in the form of balls and the locking sleeve, the locking sleeve can easily be moved into the unlocked position by an actuating element, in the form of a lever, and the opening element.

In order to achieve the necessary clearance at the switching face of the switching member and the switching face of the switching pin, according to a further embodiment of the invention, the axial relative adjustment of the switching pin towards the valve body of the first valve is limited. According to a further embodiment of this solution, the switching pin passes through a bore in the valve body. The valve body, at its end pointing towards the second coupling part, includes a projection. The projection by means of the opening spring, is loaded so as to contact a seat of the bore. Furthermore, the projection limits the adjustment of the switching pin relative to the valve body in the direction of the switching member.

In consequence, the switching pin can no longer automatically rest against the switching member under the force of the opening spring. Furthermore, the embodiment makes it possible to design the projection as a valve element and to design the seat of the bore as a valve seat. This means that the coupling operation is facilitated because, relative to the valve, a reduction in pressure can take place in the first coupling part when a second valve is arranged in front. The second valve additionally interrupts the connection with the pressurized pipeline. At the same time, it is possible to achieve an adequate sealing effect to prevent unpressurized hydraulic fluid from escaping. In particular, the sealing effect is achieved in that the valve body consists of tough plastics (for instance polyamide). Furthermore, the projection is either removably connected to the switching pin or produced so as to be integral therewith, for example formed on by beading or upsetting. In a preferred embodiment, the rotational play relative to the first valve is achieved in that a switching play exists between the switching face of the switching member and the head of the switching pin. When the switching member is in a switched position which corresponds to the closed position of the first valve, the switching play is dimensioned in accordance with the rotational play.

Alternatively or cumulatively, a distance exists between the switching face of the switching member and the switching face of the valve body. When the switching member is in a switched position which corresponds to the closed position of the first valve, the distance is dimensioned in accordance with the dimensional play.

The switching play relative to the switching pin can be achieved by a distance between the switching face of the switching member and the switching face of the head of the switching pin or by a distance between the end face of the switching pin, which faces away from the head, and the valve plate of the second valve.

To achieve the rotational play between the switching member and the switching shaft according to a further embodiment of the invention, the switching shaft, in the region where it rotationally acts on the aperture of the switching member, includes a rhombuslike cross-section. If the rotational play is provided between the opening element and the switching shaft, the connection between the two parts is designed accordingly. In a preferred embodiment, the opening element is attached to one of the switching shaft ends projecting from the housing of the first coupling part. The proposed clearance or rotational play has an additional effect in that the switching lever is able to carry out movements even in those cases where it is not subjected to loads. To prevent this, the opening element includes two resting faces and one cam face.

Furthermore, the locking sleeve is pressed into contact with the opening element by the spring loading of the locking sleeve and thus holds the actuating element. For this purpose, the locking sleeve includes an end face which is supported against the opening element. The purpose of the two resting faces of the opening element is to be loaded by the end face of the locking sleeve. The cam face serves to move the locking sleeve into the releasing position.

At least one flattened region is provided to additionally ensure that the switching member remains in its position when it is turned into the open position. Thus, a resting effect occurs as soon as the flattened region contacts a corresponding switching face of the valve body. Of course it is also possible for a flattened region to be provided on the opposite side.

In mobile hydraulic systems, and especially in the case of agricultural machinery, there is an increasing demand for hydraulic couplings which can be opened and closed against a pressure existing both at the receiving end and at the transmitting end. On the other hand, the coupling parts are to be completely leakproof in the uncoupled condition. Such total leakproofness can only be achieved cost-effectively by using so-called soft seals such as O-rings or rubber sleeve seals.

However, soft seals are disadvantageous in that a certain valve travel has to be achieved before the seal is released from its seat. As, in addition, the seal has to be provided with sufficiently large dimensions to ensure a sufficiently large through-flow quantity, it must be possible for the existing hydraulic fluid to escape when the valve is opened against an existing pressure. The hydraulic fluid can escape only up to a pressure level of 100 bar, and even then it can escape only if the pressure column is not static. If the pressure medium acting on the seal is sprung, for example by a sprung pressure store or by a weight which can still move upwardly (for instance a hydraulic lifting cylinder of a vehicle dumper, which is fully extended), such a force-actuated valve can still be opened. If, on the other hand, the counter-pressure is static, for example, as described above, as a result of a fully sealing locking block, a valve with a soft seal can no longer be opened. The counter-pressure first has to be eliminated so-to-speak by actuating the control valve.

However, in the case of agricultural machinery, this process is of a highly interfering nature. In the case of most machinery, the coupling operation cannot be carried out from the driver's seat. When the driver has left his seat and then discovers that the coupling operation can only be carried out if the control device is in a pressure relieving position, he again has to ascend and descend.

To allow, even in those cases, the valve to be opened during the coupling operation, it is proposed according to a further embodiment of the invention that the first valve is associated with a pressure relief valve.

Furthermore, the second valve, too, may be associated with a pressure relief valve. Such pressure relief valves have a very small cross-section. To relieve the pressure, an actuating path of a fracture of a millimeter is sufficient.

From the following detailed description, taken in conjunction with the drawings and subjoined claims, other objects and advantages of the present invention will become apparent to those skilled in the art.

BRIEF DESCRIPTION OF THE DRAWINGS

Two preferred embodiments of the invention are illustrated in the drawing and explained in greater detail with reference thereto:

FIG. 3 is an elevation view partially in section of the switched position of the switching lever, with the locking valve being in the locked position and with the valve closed.

FIG. 4 is a view like FIG. 3 with the locking sleeve loaded by the actuating element for the purpose of moving into the releasing position.

DETAILED DESCRIPTION OF THE DRAWINGS

Figure 1:
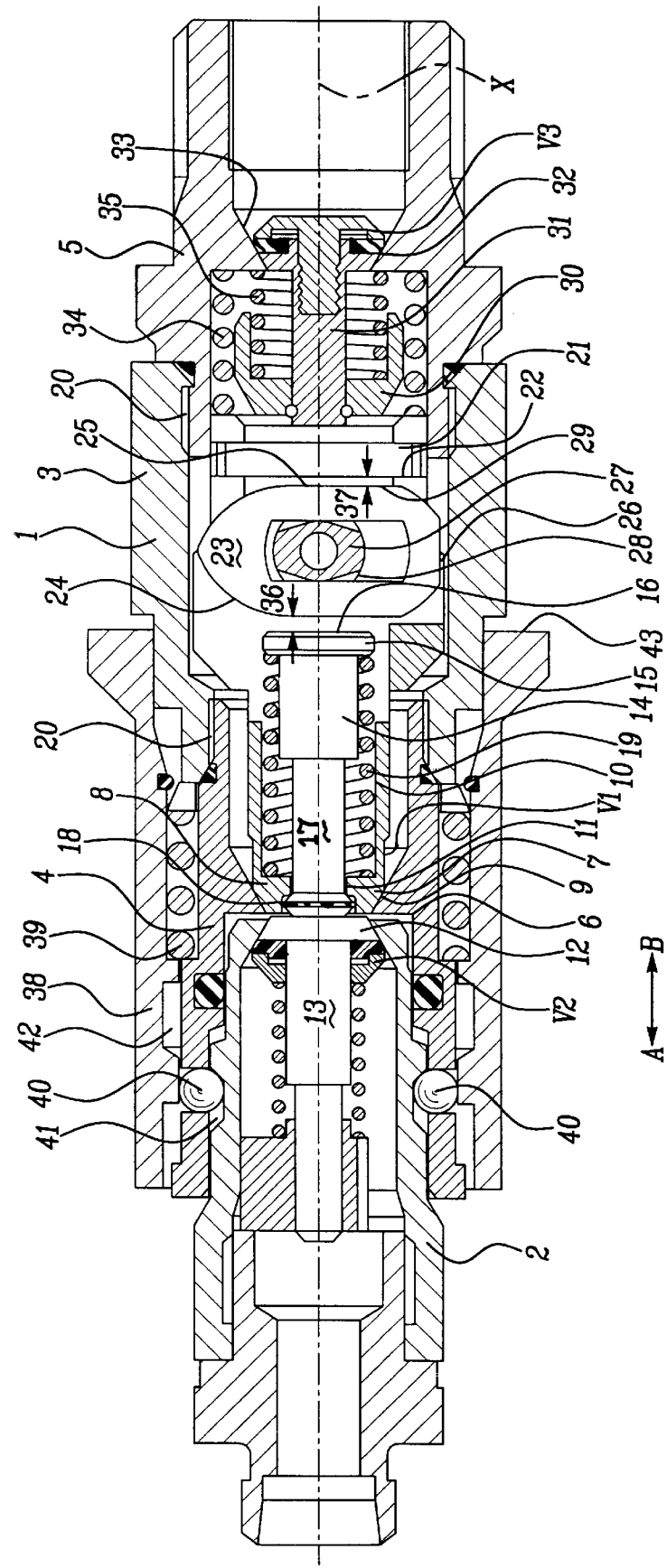
FIG. 1 is a longitudinal section view of a coupling in accordance with the present invention with the valves being in the closed condition.
Figure 2:
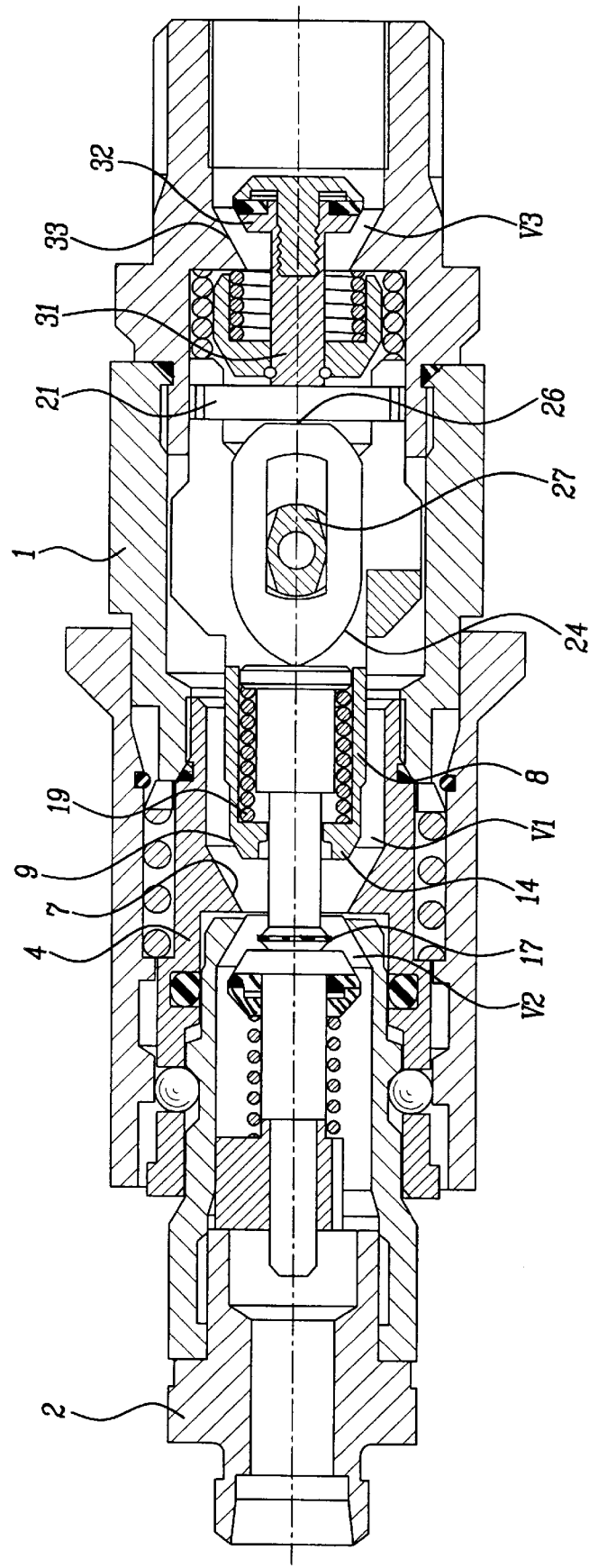
FIG. 2 is a view like FIG. 1, with the valves in an open condition.

FIGS. 1 and 2 show a first embodiment of a coupling to connect hydraulic pipelines. The first coupling part 1 is a coupling sleeve and the second coupling part 2 is a coupling plug. The first coupling part has a housing 3, a receiving part 4 and a connecting part 5. The connecting part 5 is intended to be used to connect the first coupling part 1 to a pressure agent supply line, for example. The second part 2 is plugged into the receiving part 4 of the first coupling part 1 and locked relative thereto, as explained below.

The receiving part 4 is sealingly connected to the housing 3 by a threaded connection 20. The connecting part 5 is sealingly connected to the housing 3, by a threaded connection 20. The receiving part 4 includes a conical bore which serves as a seat face 7 and ends in the face 6 which delimits the receiving space to receive the second coupling part 2. Thus, an open passage is formed towards the second coupling part 2.

The open passage is closed by the valve body 8 when the valve V1 is in the closed position. The valve V1 is formed by the seat face 7 and the valve body 8. Towards the second coupling part 2, the valve body 8 has a bore 11 which starts from a bore 10 with a larger diameter in the valve body 8. In the closed condition, the valve body 8, by means of its sealing face 9 which is also conical, rests against the conical seat face 7 of the receiving part 4.

A switching pin 14 is inserted into the bore 11. The switching pin 14 extends through the bore 11 and ends in a projection 17 received in a countersunk region 12. The edge in the region between the countersunk region 12 and the bore 11 forms a seat 13 for a sealing face 18 of the projection 17. At its other end, the switching pin 14 has a head 15 whose end face constitutes a switching face 16. An opening spring 19 is arranged between the head 15 and the end of the bore 10. The spring 19 loads the switching pin 14 away from the sealing face 9 of the valve member 8, so that the projection 17, by means of its sealing face 18, is loaded so as to contact the seat 13.

Towards the connecting part 5, the valve member 8 is provided with an aperture which receives a switching member 23. The valve body ends behind the switching member 23 towards the connecting part 5. The connecting part 5 includes a bridge 21 with a switching face 22. The two switching faces 16, 22 are loaded by switching faces 24, 25 of the switching member 23 when the latter is rotationally adjusted. One of the narrow sides of the switching member 23 is provided with a supporting face 26 which rests against the switching face 22 of the valve body 8 when the switching member 23 is in a position which is pivoted counterclockwise by 90° relative to its position shown in FIG. 1.

It can also be seen that a distance 37 exists between the switching face 24 of the switching member 23 and the switching face 16 of the head 15 of the switching pin 14. The switching member 23 is provided with an aperture 29 through which there passes a switching shaft 27 which extends transversely to the valve axis X and projects from the housing 3 at one end. The switching shaft 27 is supported in the housing 3 and in the region where it penetrates the switching member 23. The switching member 23 includes an outer face 28 with a rhombuslike cross-section.

A rotational play exists between the switching member 23 and the switching shaft 27 in the direction of rotation around the axis of rotation of the switching shaft 27. This means that relative to the switching member 23, the switching shaft 27 can be adjusted around its axis of rotation by a certain distance, without such a measure leading to a rotational adjustment of the switching member 23. In addition, the distances 36, 37 also lead to a rotational play of the switching member 23 before the switching member 23, by means of its switching faces 24, 25 when rotationally adjusted, contacts the switching faces 16, 22 of the switching pin 14 and of the bridge 21 of the valve body 8.

The closing spring 34, at one end, is supported near the bridge 21 on the valve body 8. The other end of the spring 34 is supported at the end of a recess in the connecting part 5.

The valve V3 is arranged in a receiving bore of the connecting part 5. The valve V3 has a valve plate 32 with a valve stem 31 which projects towards the bridge 21 of the valve body 8. A supporting bearing 30 is arranged on the valve stem 31. The bearing 30 includes a bore holding the closing spring 35. The other end of the closing spring 35 is supported on an end face of the bore of the connecting part 5. The closing spring 35 loads the valve plate 32 which, in consequence, contacts the conical seat face 33. The valve stem 31 of the valve V3 is supported on the bridge 21 so that the valve plate 32 of the valve V3 moves together with the valve body 8. The valve V3 is closed even if the valve V1 is closed.

The receiving part 4 is associated with a locking sleeve 38. The locking sleeve 38 is arranged coaxially relative thereto and is adjustable along the valve axis X. The locking sleeve 38 is loaded by a spring 39. The spring 39 is loaded towards a position where it holds locking elements 40, in the form of balls, in a radially inwardly displaced position. The balls are radially adjustably held in radial apertures of the receiving part 4. If, in the case of the embodiment according to FIG. 1, the locking sleeve 38 is displaced towards the left against the force of the spring 39, the recess 42, in the form of an annular groove, reaches the region of the annular elements 40 so that they are able to escape radially outwardly. Thus, the balls move radially from the groove 41 into the second coupling part 2, which is thus released.

The second coupling part 2 is connected to a second valve V2 which is also closed as long as the valves V1 and V3 are not opened by the switching member 23. The two coupling parts 1, 2 are thus coupled and locked relative to one another. If the switching member 23 is now pivoted counterclockwise by 90°, starting from the position shown in FIG. 1, until it assumes the position shown in FIG. 2, so that if lengthwise, it extends parallel to the valve axis X, the valves V1 and V3 are opened as the pivoting movement continues. Thus, it is possible for a pressure medium to flow from the pressure agent pipeline connected to the connecting part 5 through the valve V3, the housing 3, and the valves V1 and V2 to the coupling part 2.

While the switching member 23 is pivoted and after it has passed through the clearance resulting from the rotational play, contact takes place between the switching faces 24, 25 and the switching faces 16 of the switching pin 22 and of the bridge 21 of the valve body 8, respectively. The valve body 8, with its sealing face 9, is moved from the sealing face 7 according to FIG. 1, along the valve axis X towards the right in the direction of arrow B against the force of the two closing springs 34, 35. As the valve plate 32 of the valve V3 is loaded by the valve body 8, by means of the valve stem 31, it simultaneously moves away from the seat face 33 and opens the valve V3. In consequence, the two valves V1 and V3 are opened.

However, the switching pin 14 is also moved by the switching member 23 relative to the valve body 8 towards the left in the direction of arrow A. The pin 14 projects beyond the face 6 of the receiving part 4 and loads the valve plate of the valve V2. Thus, the pin is lifted from the associated valve seat with the opening of valve V2. In the process, the opening spring 19 is compressed. In the position illustrated in FIG. 2, the switching member is established in its position in that its planar supporting face 26 contacts the switching face 22.

As can be seen in FIGS. 3 and 4, the switching shaft 27 is actuated by an actuating element 48, in the form of a lever. If the valves V1 and V3 are in the position as illustrated in FIG. 2, the lever 40 is in the switched position III according to FIG. 3 if the second coupling part 2 is coupled in the receiving part 4. However, for the sake of clarity, this is not shown.

The switching shaft 27 is associated with an opening element 47. The opening element includes two resting faces 44, 45 and also a cam face 46. If the actuating element 48 is in position III, the resting face 44 is positioned opposite the end face 43 of the locking sleeve 38. By means of its end face 43, the locking sleeve 38 contacts the face as a result of the force of the spring 39 loading the locking sleeve and stabilizes the actuating element 48 in this position.

If the connection between the two coupling parts 1 and 2 is now to be released, the actuating element 48, starting from FIG. 2, has to be pivoted from its position III clockwise. In the process, the opening element 47, positioned on the switching shaft 27 is also adjusted accordingly. First, during the pivoting movement, the withholding force applied by the resting face 44 has to be overcome. During the further pivoting movement, the switching member again assumes the position as illustrated in FIG. 1. The valves V1 and V3 are again transferred into the closed position by the springs loading the valves V1, V3. However, as the system as a whole is still under pressure, the locking elements 40 in the form of balls are pressed radially outwardly against the locking face of the locking sleeve 38. When this position is reached, the actuating element 48 is in position I. The resting face 45 of the opening element 47 is loaded by the end face 43 of the locking sleeve 38 so that the actuating element 48 is stabilized in this position. If now, starting from position I, the actuating element 48 continues to be pivoted clockwise into position II, the end face 43 of the locking sleeve 38 is loaded by the cam face 46 of the opening element 47. The locking sleeve 38 is moved against the force of the spring 39 towards the coupling part 2 until the recess 42 overlaps with the locking elements 40. This allows the locking elements to project radially outwardly, so that the coupling part 2 can be pulled out of the receiving part of the first coupling part. As a result, the coupling connection is released. The position of the locking sleeve 38 relative to the receiving part 4 is illustrated in FIG. 4. If the actuating element 48 is released, the force of the spring 39 acting on the locking sleeve 38 causes it once again to return into the position according to FIG. 3.

As the second coupling part 2 is inserted when the valves V1 and V3 of the first coupling part 1 are closed, and also when the valve V2 of the second coupling part is closed, the coupling operation requires very little force. The valves V1 and V3 are not transferred into the open position until the coupling operation has been completed. Because of the two valves V1 and V3, the first coupling part 1 includes two pressure chambers which are separated from one another by the valve V3. When the second coupling part 2 is uncoupled, the pressure chamber between the valves V1 and V3 becomes pressure-less. The pressure is reduced as a result of the pressure relief valve 48 formed by the projection 17 of the switching pin 14 in connection with the seat 13. The quantity of fluid emerging in the process is hardly measurable. As in this condition the chamber between the two valves V1 and V3 is pressure-less, the sealing effect between the projection 17 and its seat 13 is sufficient to prevent any further fluid from escaping.

As already mentioned, it is possible for both the valve V2 of the second coupling part 2 and valve V3 of the first coupling part 1 to be subjected to high pressures. In those cases where both coupling parts 1, 2 are connected to one another, there may be a need for high rotational forces to be able to open valves V1 to V3, especially V2 and V3. This is due to the fact that in order to allow an adequate quantity of hydraulic medium to flow through, these valves have to be provided with correspondingly large dimensions. With applications involving high pressures it is advisable to provide additional pressure relief valves for valves V2 and V3. The way in which such valves are associated with one another is shown in greater detail in FIG. 5.

Figure 5:
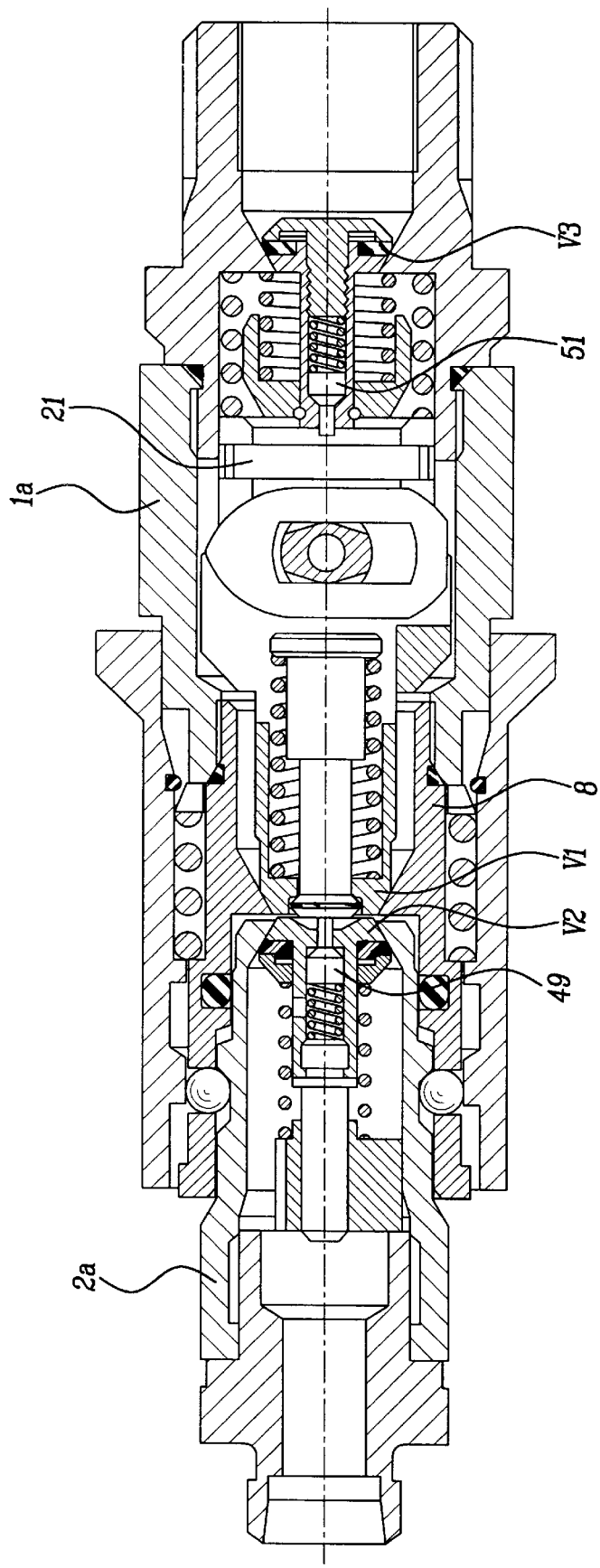
FIG. 5 is a longitudinal section view of a further embodiment of the coupling according to FIGS. 1 and 2, with additional pressure relief valves.

FIG. 5 shows that the valve V2 of the second coupling part 2a is associated with a pressure relief valve 49 with a small cross-section. Depending on the application, a diameter of less than 2 mm is provided so that a relatively low force is required to open the valve against the existing hydraulic pressure. The valve V3 is also associated with a pressure relief valve 51. The sealing cone of the pressure relief valve 49, of the second coupling part 2a, by means of it projection, penetrates the sealing cone of the valve V2 and is positioned in front of the projection 17 of the switching pin 14 at a small distance therefrom. In a preferred embodiment, the sealing cone of the valve V2, at its end face, includes a trough-shaped recess, so that the projection 17 is pressed axially in direction A before the switching pin 14 loads the sealing cone of the valve V2.

The same applies to the pressure relief valve 51 of the valve V3 whose valve cone includes a projection which is loaded first by the bridge 21 of the valve body 8. When the projection moves in the direction of arrow B, before the valve stem 31 is loaded by the bridge 21.

Overall, it can be seen that the rotational play existing as a result of the distances 36 and 37 and the distance between the end face of the valve stem 31 and the bridge as well as the rotational play existing between the switching shaft 27 and the switching member 23 are used to ensure that the locking sleeve 38 is adjusted by the opening element 47 when the actuating element 48 is actuated.

It is also possible to connect the opening element 47 to the actuating element 48. Both together include a clearance relative to the switching shaft. The clearance can be used for actuating the locking sleeve.

Figure 6:
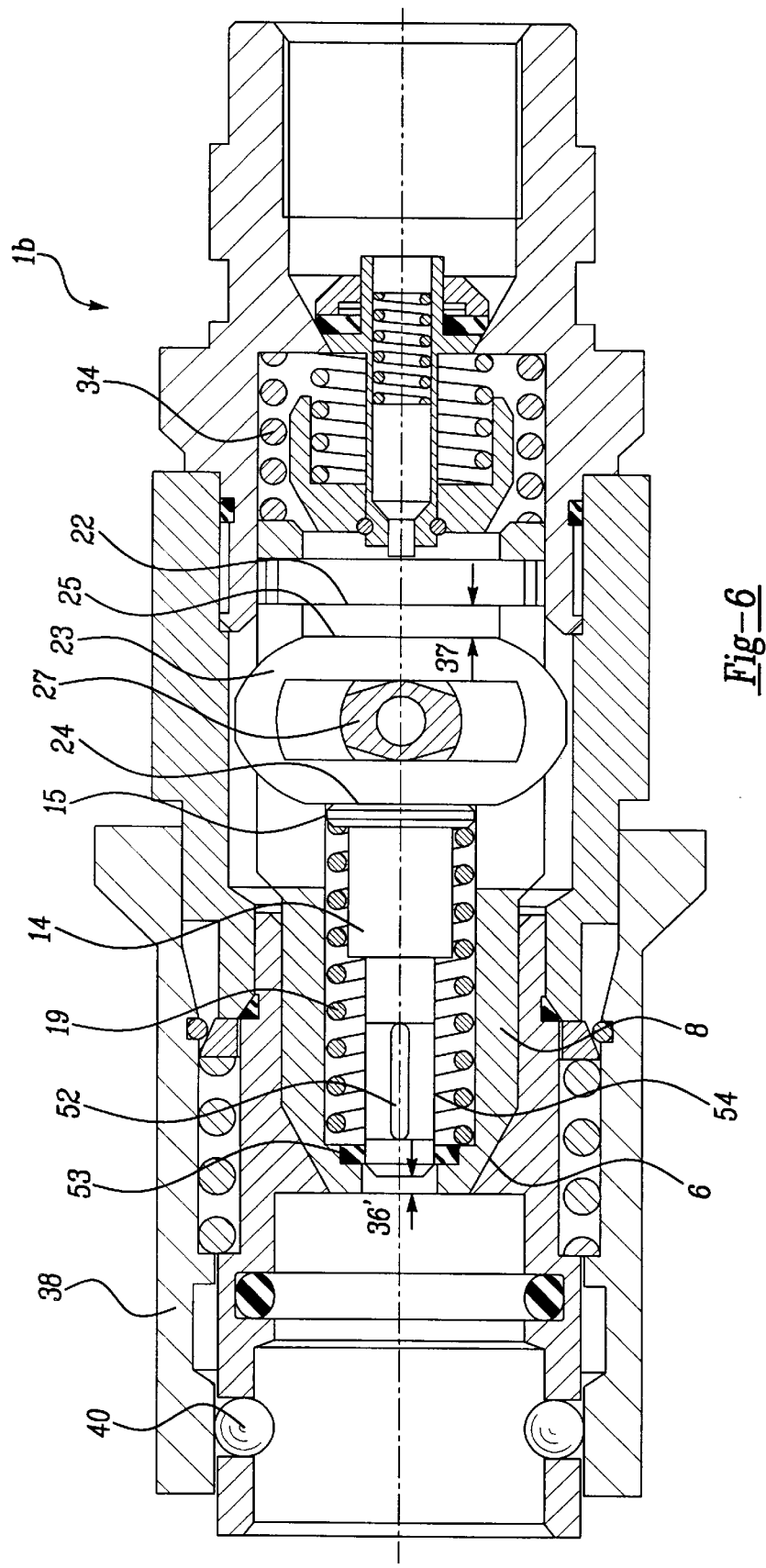
FIG. 6 is a longitudinal section view of a further embodiment of a first coupling part where the switching play between the switching pin and the valve plate of the second valve, until the point in time when the switching member becomes effective, is achieved by a distance between the switching pin and the opposed face of the valve plate of the second valve of the second coupling part.

The embodiment of the first coupling part 1b according to FIG. 6 deviates from the embodiment according to FIGS. 1 and 2 in that the switching pin 14, by means of the end face of its head 15, is held in contact with the switching face 24 of the switching member 23. The rotational play between the switching member 23 and the switching shaft 27 actuating the switching member 23 relative to the switching pin 14, which opens the valve V2 shown in FIG. 2, is achieved by a distance 36' between the end face of the switching pin 14 facing away from the head 15. The face 6 constitutes a plane. In the coupled, but unopened condition of the coupling, the end face of the valve plate of the second valve V2, which end face has to be loaded, is positioned adjacent face 6. The switching face 14 includes a cylindrical portion near its end face loading the second valve V2. The cylindrical portion is sealingly guided in a seal 53, with the coupling in the closed condition. This cylindrical portion, in the direction of the head 15, is followed by a number of grooves 52 arranged on the circumference of the switching pin 14. Alternatively, a necking 54 may follow the cylindrical portion. The necking 54 enables a pressure medium to pass underneath the seal 53 if the coupling is switched accordingly, if it is in the open position. In the open position, the groove 52 is at the level of the seal 53.

While the above detailed description describes the preferred embodiment of the present invention, the invention is susceptible to modification, variation and alteration without deviating from the scope and fair meaning of the subjoined claims.

I claim:

1. A coupling for connecting hydraulic pipelines, comprising:

a first coupling part and a second coupling part, said first coupling part including a first valve, a housing and means for receiving the second coupling part;

said second coupling part including a second valve, said first valve including a valve body which, in a closed position, contacts a sealing face and is axially penetrated by a switching pin which is adjustable relative thereto towards the second valve;

a switching shaft with an actuating member, said switching shaft arranged transversely to a valve axis and penetrating the housing of the first coupling part and carrying a switching member, said switching member including switching faces which, when rotationally adjusted, act on a switching face of the valve body of the first valve and on a switching face of the switching pin for adjusting said first valve and switching pin, and with the switching pin being loaded by an opening spring supported on the valve body of the first valve towards the switching member, said valve body of the first valve being loaded by at least one closing spring with the switching pin serving to move the second valve into the open position and with the first coupling part being associated with an axially adjustable locking sleeve and with locking elements in a coupled condition, locking the first and second coupling parts relative to one another, and with the locking sleeve being transferable into a releasing position by being axially adjusted, and in the coupled condition of said first and second coupling parts with the valves and the switching member in a position which corresponds to the closed position of said first and second coupling parts, a rotational play exists between the switching faces of the switching member and opposed switching faces of the switching pin and valve member of the first valve, between the switching shaft and the switching member and between the actuating member and the switching shaft, said switching shaft is associated with an opening element which, upon rotational adjustment of the actuating member and when passing through the rotational play against the direction of rotation of the switching member from the closed position into the open position, loads the locking sleeve in order to be moved into the releasing position.

2. A coupling according to claim 1, wherein the axial relative adjustment of the switching pin towards the valve body of the first valve is limited.

3. A coupling according to claim 2, wherein the switching pin passes through a bore in the valve body and that the switching pin, at an end of said switching pin pointing towards the second coupling part, includes a projection which, by means of the opening spring is loaded so as to contact a seat of the bore and which, limits the adjustment of the switching pin relative to the valve body in the direction of the switching member.

4. A coupling according to claim 3, wherein the projection is designed as a valve element and the seat as a valve seat.

5. A coupling according to claim 3, wherein the projection is removably connected to the switching pin.

6. A coupling according to claim 3, wherein the projection is integrally connected to the switching pin and formed on to the switching pin by beading or upsetting.

7. A coupling according to claim 1, wherein between the switching face of the switching member and the switching pin, switching play exists when the switching member is in a switched position which corresponds to the closed position of the first valve, said switching play is dimensioned in accordance with the rotational play.

8. A coupling according to claim 1, wherein between the switching face of the switching member and the switching face of the valve body, a switching play exists, defined by a distance, when the switching member is in a switched position which corresponds to the closed position of the first valve, said switching play is dimensioned in accordance with the rotational play.

9. A coupling according to claim 7, wherein the switching play exists as a result of a distance, if present, between the switching faces of the switching member and the switching face of the head of the switching pin and between the end face of the switching pin removed from the head and the valve plate of the second valve.

10. A coupling according to claim 1, wherein the switching shaft, in the region where it rotationally acts on the aperture of the switching member, said switching member including a rhombuslike cross-section for the purpose of achieving a rotational play.

11. A coupling according to claim 1, wherein the opening element is attached to one of the two ends of the switching shaft which project from the housing of the first coupling part.

12. A coupling according to claim 1, wherein the opening element includes two resting faces and a cam face.

13. A coupling according to claim 1, wherein the locking sleeve is pressed into contact with the opening element by the spring loading the opening element.

14. A coupling according to claim 13, wherein the locking sleeve includes an end face which is supported on the opening element.

15. A coupling according to claim 1, wherein the first valve is associated with a pressure relief valve.

16. A coupling according to claim 1, wherein the second valve is associated with a pressure relief valve.

* * * * *